(12) United States Patent
Prust

(10) Patent No.: US 6,259,060 B1
(45) Date of Patent: Jul. 10, 2001

(54) GROUNDING/SEALING GASKET

(75) Inventor: Andrew J. Prust, Coon Rapids, MN (US)

(73) Assignee: Phillips & Temro Industries Inc., Eden Prairie, MN (US)

(*) Notice: Subject to any disclaimer, the term of this patent is extended or adjusted under 35 U.S.C. 154(b) by 0 days.

(21) Appl. No.: 09/492,257

(22) Filed: Jan. 27, 2000

Related U.S. Application Data

(60) Provisional application No. 60/117,750, filed on Jan. 27, 1999.

(51) Int. Cl.[7] ..................................................... F02M 31/00
(52) U.S. Cl. ............................ 219/206; 219/541; 123/549
(58) Field of Search ..................................... 219/206, 541, 219/202; 123/549

(56) References Cited

U.S. PATENT DOCUMENTS

| 1,160,327 | * | 11/1915 | Ross .................................... 123/549 |
| 1,387,276 | * | 8/1921 | Kutsche ............................... 123/549 |
| 1,472,233 | * | 10/1923 | Taylor, Jr. et al. .................. 123/549 |
| 3,492,457 | * | 1/1970 | Subt .................................... 123/549 |
| 4,116,183 | * | 9/1978 | Hayward ............................. 123/549 |
| 4,242,999 | * | 1/1981 | Hoser .................................. 219/206 |
| 4,384,563 | * | 5/1983 | Siefer et al. ........................ 123/549 |

* cited by examiner

Primary Examiner—John A. Jeffery
(74) Attorney, Agent, or Firm—Harness, Dickey & Pierce, P.L.C.

(57) ABSTRACT

An air intake heater for use in a motor vehicle has an engine with an engine block and an intake manifold defining an air passageway. The air intake heater includes a gasket having a conductor plate disposed between two non-conducting sealant layers, the conductor plate has at least one inner terminal adapted for positioning inside the air passageway and at least one outer terminal adapted for positioning outside the air passageway. A heating element is coupled to the gasket and adapted to be disposed within the air passageway, wherein the inner terminal is electrically coupled to the heating element and the outer terminal is electrically coupled to a power source.

20 Claims, 4 Drawing Sheets

GROUNDING/SEALING GASKET

RELATED APPLICATION

This is a utility patent application claiming the benefit of U.S. Provisional Application Ser. No. 60/117,750, filed Jan. 27, 1999.

BACKGROUND OF THE INVENTION

1. Technical Field

The present invention relates to an electrical attachment for an electrically powered apparatus and, more particularly, to an electrically powered heater for use in an intake manifold of an internal combustion engine.

2. Discussion

Vehicles operating in colder climates are commonly equipped with a heater to warm the engine block or the air/fuel mixture entering the cylinders of an internal combustion engine. The air intake heating devices generally include a heating element disposed in the intake air passageway of an engine and electrically connected to a power source. Current is passed through the heating element to increase the temperature of the surrounding air as it passes the heating element and enters the combustion chamber of the engine.

With the advent of aerodynamic concerns and component weight reduction in an attempt to increase fuel economy, the engine compartment of motor vehicles has become a significant packaging challenge. Specifically, components buyers have been strongly urged by the vehicle manufacturers to create components which require less space and weigh less than their predecessors. In addition, the volume metric envelope in which the engine must package has been similarly reduced. In order to accomplish this task, the engine manufacturer has had to reduce the clearance between components such as the intake and the engine head. Accordingly, access to portions of the engine compartment may be limited.

In view of the above trends, a need exists for an air intake heater requiring a minimal amount of space outside of the engine components. In addition, a need exists for an air intake heater having an electrical attachment that originates inside of the intake manifold and is completed outside of the manifold.

SUMMARY OF THE INVENTION

The invention allows the termination of the air intake heater in a very confined space while optimizing heat transfer and minimizing air flow restrictions. More particularly, the grounding/sealing gasket of the present invention provides an electrical attachment that originates inside the manifold and is completed outside the manifold.

An air intake heater for use in a motor vehicle has an engine with an engine block and an intake manifold defining an air passageway. The air intake heater includes a gasket having a conductor plate disposed between two non-conducting sealant layers, the conductor plate has at least one inner terminal adapted for positioning inside the air passageway and at least one outer terminal adapted for positioning outside the air passageway. A heating element is coupled to the gasket and adapted to be disposed within the air passageway, wherein the inner terminal is electrically coupled to the heating element and the outer terminal is electrically coupled to a power source.

BRIEF DESCRIPTION OF THE DRAWINGS

Other advantages of the invention will become apparent to one skilled in the art upon reading the following specification, drawings and subjoined claims.

DETAILED DESCRIPTION OF THE PREFERRED EMBODIMENTS

Figure 1:
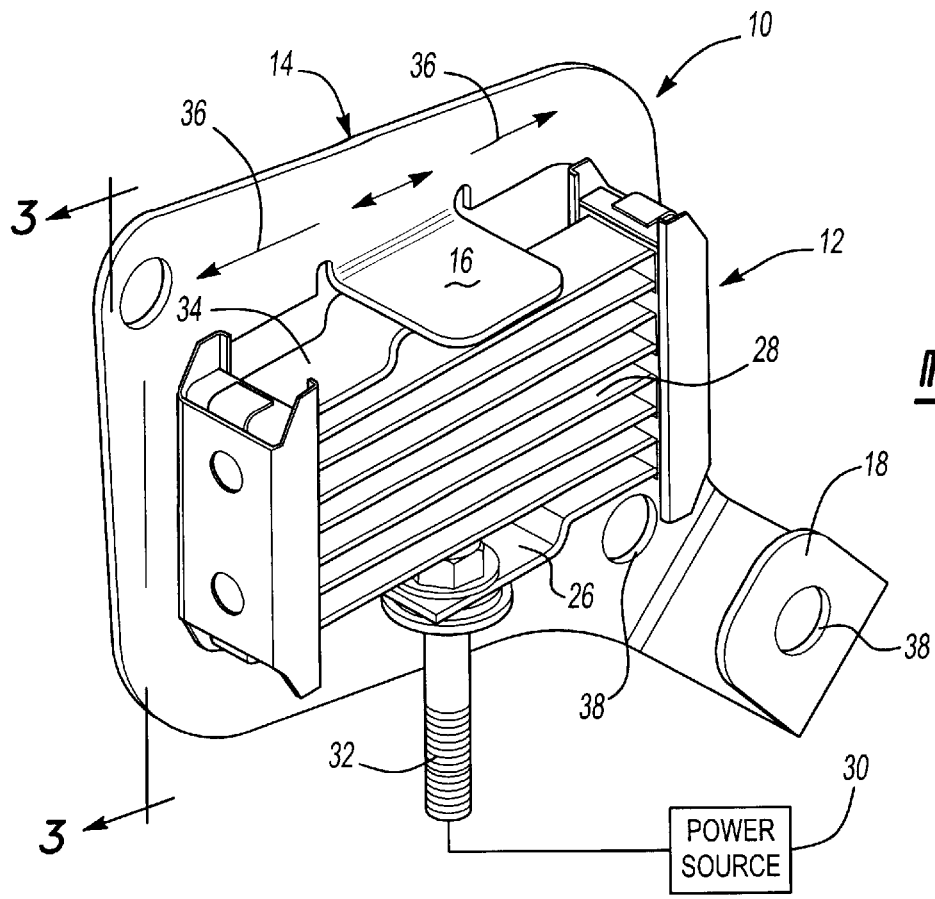
FIG. 1 is a perspective view of the grounding/sealing gasket of the present invention.

The invention described and illustrated herein is directed to an air heating device for use in an internal combustion engine. More particularly, the grounding/sealing gasket provides for mounting the air intake heater in a very confined space while optimizing heat transfer and minimizing air flow restrictions. More particularly, the grounding/sealing gasket of the present invention provides an electrical attachment that originates inside the manifold and is completed outside of the manifold.

With reference to the drawings, a grounding/sealing gasket constructed in accordance with the teachings of an embodiment of the present invention is generally identified at reference numeral 10. The grounding/sealing gasket is shown operatively associated with an exemplary air intake heater 12.

Figure 2:
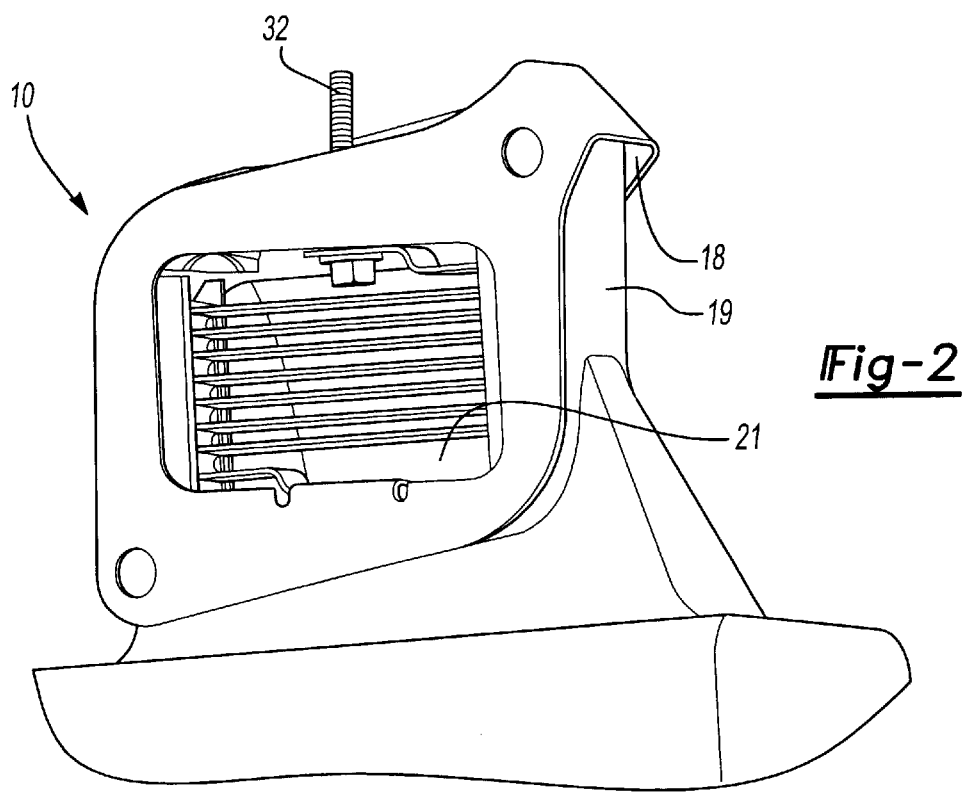
FIG. 2 is a perspective view of the grounding/sealing gasket coupled to an exemplary intake manifold.

As particularly shown in FIG. 1, the grounding/sealing gasket is illustrated to generally include a plate-like body 14 having a first tab 16 and a second tab 18 integrally formed therewith. In a first embodiment of the present invention, the gasket 10 is adapted for insertion between an intake manifold 19 (FIG. 2) and a block (not shown) of an internal combustion engine. Accordingly, the air intake heater 12 is placed within an air passageway 21 defined by the intake manifold 19. Furthermore, the gasket 10 provides a mechanical seal between the intake manifold 19 and the engine block as well as grounding of the air intake heater 12 such as to the intake manifold 19 as illustrated in FIG. 2.

Figure 3:
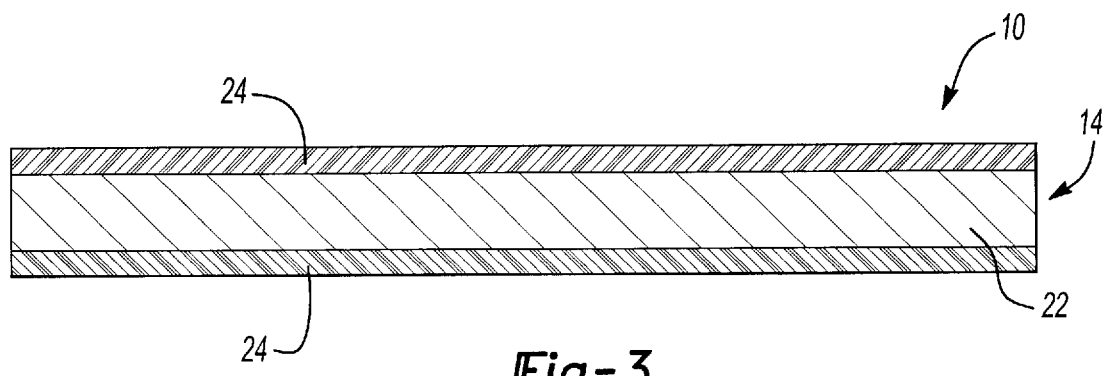
FIG. 3 is a cross-sectional side view of the grounding/sealing gasket of the present invention.

As best illustrated in the cross-sectional view of FIG. 3, the plate-like body 14 of the gasket 10 includes an electrical conductor plate 22 sandwiched by two non-conductive sealant layers 24. The first tab 16 and the second tab 18 of the gasket 10 are not coated with sealant and may be electrically coupled to ground or to another heater as needed to satisfy the heating requirements of the particular application.

One skilled in the art will appreciate that the non-conductive sealant layers 24 act as cushions to take up any imperfections in the intake manifold 19 or the engine block. It should also be appreciated that silicone may be used as an insulator and a sealant in this application by vulcanizing the silicone to the plate-like body 14 or utilizing a pressure sensitive adhesive for attachment. Additionally, the sealant layer 24 may be supported with a fiberglass mesh for ease of handling and positioning on the plate-like body 14. In general, supported silicone is more workable but does not provide the same degree of sealing as the unsupported silicone. Accordingly, the specific structural configuration of the sealant 24 will depend on the application requirement.

Figure 4:
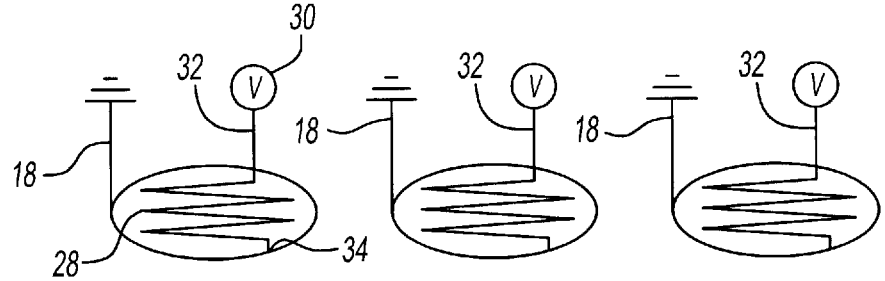
FIG. 4 is an electrical schematic depicting a parallel and a series connection of multiple grounding/sealing gaskets.
Figure 4:
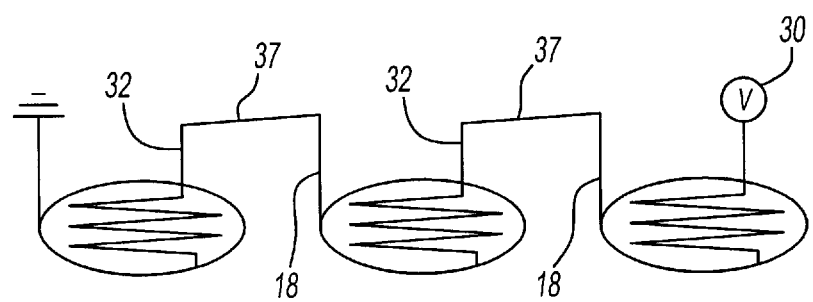

FIG. 4 illustrates a parallel and a serial connection of intake heaters 12 using the grounding/sealing gasket 10 of the present invention. In the parallel connection configuration, a first end 26 of a heating element 28 is connected to a power source 30 such as through a terminal 32 (FIG. 1). A second end 34 of the heating element 28 is electrically coupled to the first tab 16 of the gasket 10. When energized, current passes through the terminal 32, heating element 28 and into the conductor plate 22 of gasket 10 via the first tab 16. The current, as best illustrated by arrows 36 in FIG. 1, proceeds bi-directionally through the conductor plate 22 to ground via the second tab 18.

FIG. 4 also illustrates a series connection arrangement for the gasket 10 of the present invention. Specifically, as will be appreciated by those skilled in the art, an electrical connector 37 may be used to connect the second tab 18 of an upstream gasket to the terminal 32 of a downstream gasket to provide a serial connection of heater elements. In this manner, any number of grounding/sealant gaskets 10 may be electrically coupled in series to suit a specific application.

It should be appreciated that the conductor plate 22 is a current carrying member and as such, care must be taken to provide an appropriate cross-sectional area to deliver current while preventing undesirable self-heating. As shown in FIG. 1, a parallel path is provided as illustrated by arrows 36 thereby increasing the amount of current that the conductor plate 22 may transfer. However, in this configuration, it is preferred that the lengths of the respective parallel current paths remain the same to equalize the resistance within the paths and subsequently the self-heating within the conductor.

With the above concerns in mind, the preferred embodiment of the present invention includes a 0.060 inch thick conductor plate 22 for passing the current. Mechanical sealing and electrical insulation are provided by sealant layers 24 having a thickness of approximately 0.020 inches. The resulting 0.100 inch gasket height provides a suitable configuration for the application illustrated in FIG. 2. However, those skilled in the art will appreciate that the specific configuration, including the conductor and sealant thicknesses as well as the specific configuration of the first tab 16 and the second tab 18 along with the conductor plate 22 itself, may be varied to satisfy application specific criterion.

It should further be appreciated that the interconnection of the grounding/sealing gasket 10 and the intake manifold 19 may be accomplished through a variety of mechanical connections generally known in the art. It is contemplated that the connection may be specifically accomplished through a bolt or welded stud connection at the second tab 18 via the use of fastener apertures 38. It is further contemplated that the heating element 28 may be connected to the gasket 10 through a variety of techniques such as welding.

Figure 5:
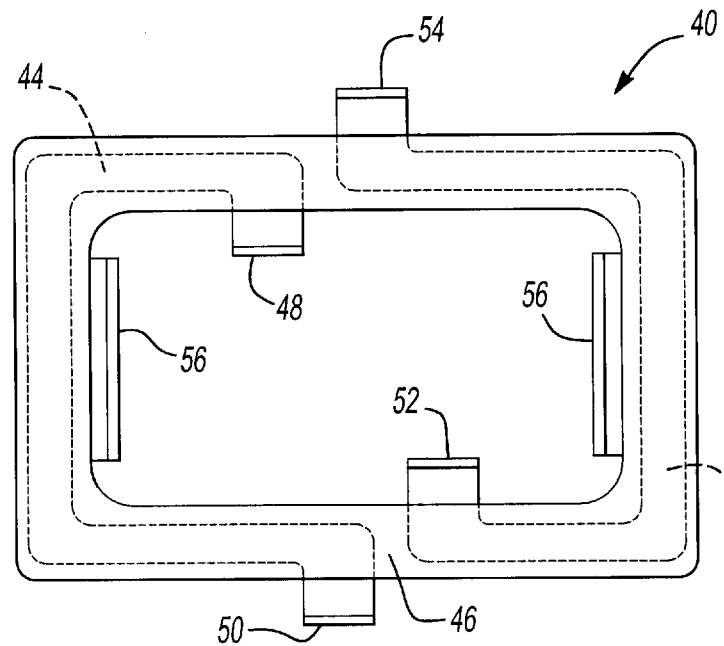
FIG. 5 is a top view of a second embodiment of the grounding/sealing gasket of the present invention.

With reference to FIGS. 5–8, a second embodiment of the grounding/sealing gasket of the present invention is generally depicted to offer a drop-in style heater having both the power and ground terminals positioned outside of the engine. Accordingly, no modifications to the intake manifold or block are required. The second embodiment of the grounding/sealing gasket includes a gasket assembly 40 that achieves the previously mentioned goal by encapsulating a ground conductor 42 and a power conductor 44 within a non-conductive medium 46 as shown in FIG. 5. The ground conductor 42 and the power conductor 44 are preferably constructed from an electrically conductive material such as galvanized steel or copper sheet. The metal conductors are supported in the non-conductive medium 46 such that the portions positioned between the intake manifold 19 and an engine block 47 (FIG. 8) are electrically insulated therefrom. The non-conductive medium 46 may be constructed from a thermoplastic, silicon, ceramic or fiberglass preferably injection molded about the ground conductor 42 and the power conductor 44 to create the grounding/sealing gasket 40. One skilled in the art will appreciate that an additional sealant may be required to provide an air tight seal between the two surfaces of the gasket assembly 40 with the intake manifold 19 and the engine block 47. If an additional sealant is required, methods known in the art such as providing a gasket, an O-ring, or pliable sealant are suitable for this purpose.

Figure 6:
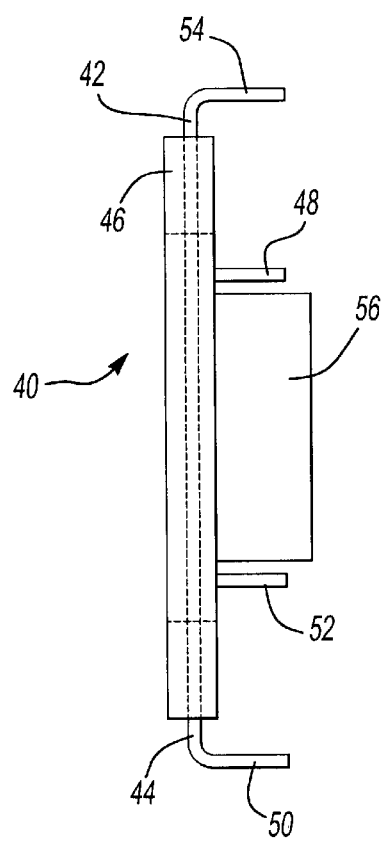
FIG. 6 is a side view of the grounding/sealing gasket shown in FIG. 5.

FIGS. 5 and 6 depict the power conductor 44 including an internal terminal 48 and an external terminal 50 protruding from the non-conductive medium 46. In similar fashion, the ground conductor 42 includes an internal terminal 52 and an external terminal 54 extending therefrom. Each of the ground conductor and the power conductor also include a heater mounting flange 56. In the preferred embodiment, the heater mounting flanges 56 are not used as electrical conductors but simply mechanical mounting means for the air intake heater 12. Accordingly, the heater mounting flanges 56 are merely exemplary and a variety of other mounting schemes may be implemented without departing from the scope of the present invention.

Figure 7:
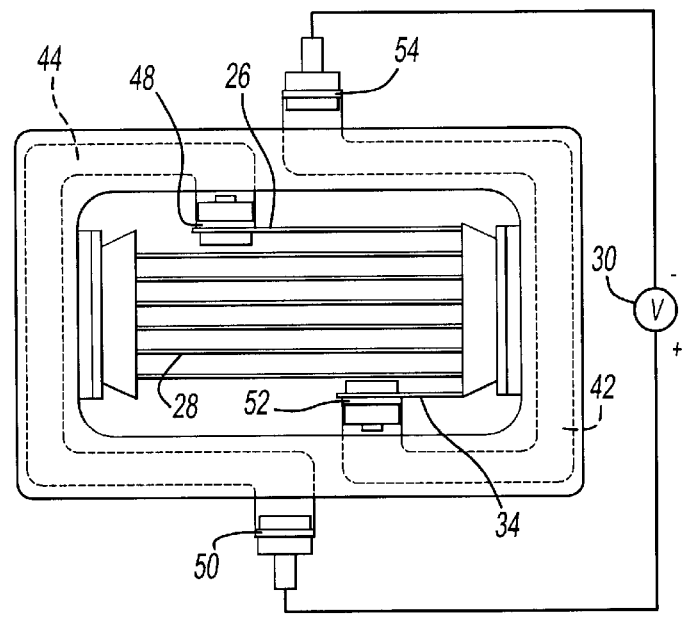
FIG. 7 is a top view of the second embodiment of the grounding/sealing gasket coupled to an exemplary heater.
Figure 8:
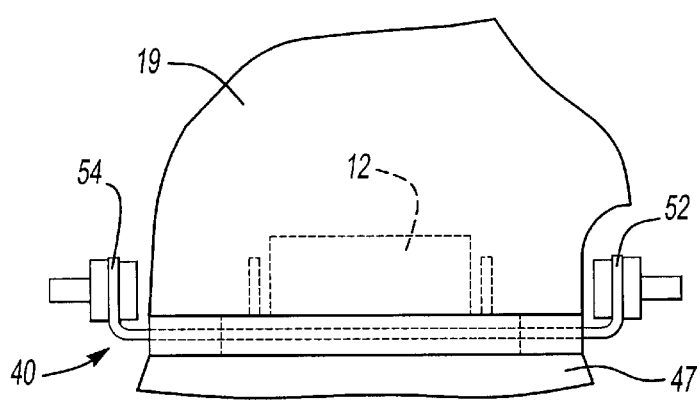
FIG. 8 is a side view of the heater and gasket subassembly of FIG. 7 coupled to an exemplary intake manifold and engine block.

Referring to FIGS. 7 and 8, the first end 26 of the heating element 28 is coupled to the internal terminal 48 of the power conductor 44. Additionally, the second end 34 of the heating element 28 is electrically and mechanically coupled to the internal terminal 52 of the ground conductor 42. In this manner, a circuit is constructed with current entering at the external terminal 50 of the power conductor, traveling through the heating element 28 and exiting through the external terminal 54 of the ground conductor 42.

Figure 9:
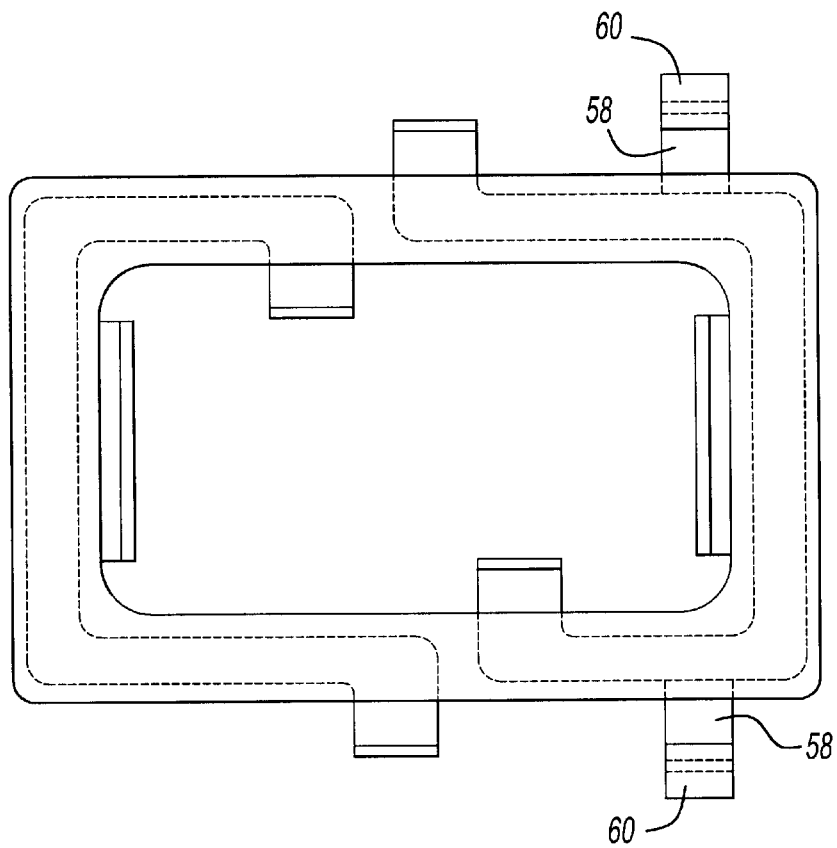
FIG. 9 is a top view of a grounding/sealing gasket including power cord supports.
Figure 10:
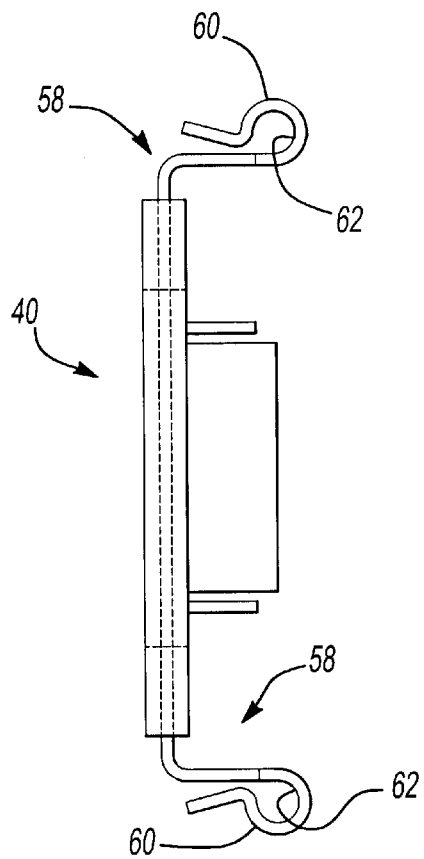
FIG. 10 is a side view of the grounding/sealing gasket of FIG. 9.

FIGS. 9 and 10 depict a further refinement of the gasket assembly 40 of the present invention including a pair of power cord supports 58 integrally formed with the ground conductor 42 and extending outwardly therefrom. In the preferred embodiment, the power cord supports are "P" shaped clamps for securing and supporting the wires coupled to the external terminals. Each of the clamps or supports 58 includes a looped band 60 defining an aperture 62 for receipt of a wire (not shown). The aperture 62 may be reduced in size by closing the loop such as via threaded fasteners (not shown). However, the specific configuration of the support 58 is merely exemplary and one skilled in the art should appreciate that other clamping or support mechanisms may be utilized without departing from the scope of the present invention. It should also be appreciated that each of the power cord supports 58 extend from the ground conductor 42 thereby eliminating the possibility of inadvertent short circuiting through contact of tools such as screwdrivers and the like.

In view of the above description of the present invention, it should be appreciated that the grounding/sealing gasket of the present invention facilitates attachment of an intake air heater within the air passageway of the manifold in situations where space constraints prohibit conventional mounting. The mechanical sealing and electrical insulation of the conductor plate 22 by sealant layers 24 effectively manages current and air flow for proper operation of the heater.

The foregoing discussion discloses and describes merely exemplary embodiments of the present invention. One skilled in the art will readily recognize from such discussion, and from the accompanying drawings and claims, that various changes, modifications and variations may be made therein without department from the spirit and scope of the invention as defined in the following claims.

What is claimed is:

1. An air intake heater for use in a motor vehicle having an engine with an engine block and an intake manifold defining an air passageway, the air intake heater comprising:
    a gasket having a conductor plate disposed between two non-conducting sealant layers, said conductor plate having an inner terminal adapted for positioning inside the air passageway and an outer terminal adapted for positioning outside the air passageway; and
    a heating element coupled to said gasket and adapted to be disposed within the air passageway;
    wherein said inner terminal is electrically coupled to said heating element and said outer terminal is adapted to be coupled to one of the engine block and the intake manifold.

2. The air intake heater of claim 1 wherein said inner terminal includes a first tab integrally formed with said conductor plate.

3. The air intake heater of claim 2 wherein said outer terminal includes a second tab integrally formed with said conductor plate.

4. The air intake heater of claim 3 wherein said second tab is adapted to mechanically and electrically couple said gasket to the intake manifold.

5. The air intake heater of claim 1 further including a second inner terminal and a second outer terminal electrically interconnected.

6. The air intake heater of claim 5 wherein said heating element is electrically positioned in series between said second inner and outer terminals and said inner and outer terminals.

7. The air intake heater of claim 1 wherein said gasket is adapted to be disposed between said intake manifold and said engine block.

8. The air intake heater of claim 7 wherein none of said at least one inner terminals or said second inner terminal are adapted to pass through the intake manifold.

9. A gasket assembly for use with an air intake heater in a motor vehicle having a power source, an engine with an engine block and an intake manifold wherein the intake manifold defines an air passageway, the grounding/sealing gasket comprising:
    an insulator having an aperture adapted to communicate with the air passageway;
    a power conductor partially embedded within said insulator, said power conductor having a first internal terminal disposed within said aperture and a first external terminal positioned outside said aperture; and
    a ground conductor partially embedded within said insulator and electrically insulated from said power conductor, said ground conductor having a second internal terminal disposed within said aperture and a second external terminal positioned outside said aperture, said first internal terminal and said second internal terminal adapted for electrical connection to the air intake heater, said first and second external terminals adapted for connection to the power source.

10. The gasket assembly of claim 9 wherein one of said power conductor and said ground conductor includes a flange adapted for mounting the air intake heater thereto.

11. The gasket assembly of claim 9 wherein said ground connector includes a power cord support integrally formed therein.

12. The gasket assembly of claim 11 wherein said power cord support includes an aperture for receipt of an electrical wire, said aperture selectively reducable in size to restrain said wire from moving relative to one of said first and second external terminals.

13. The gasket assembly of claim 9 wherein said first internal terminal and said second internal terminal are adapted to be electrically interconnected via the air intake heater.

14. An engine for a motor vehicle comprising:
    an engine block;
    an intake manifold defining an air passageway;
    a gasket having an aperture substantially aligned with said air passageway, said gasket sandwiched between said engine block and said intake manifold; and
    an air intake heater disposed in said air passageway and coupled to said gasket, wherein said gasket includes a first conductor plate having a portion thereof insulated from said intake manifold, said first conductor plate having an internal terminal coupled to said air intake heater and an external terminal coupled to a power source.

15. The engine of claim 14 wherein a spacing between said intake manifold and said engine block is increased a distance less than 0.175 inches by the installation of said grounding/sealing gasket.

16. An engine for a motor vehicle comprising:
    an intake manifold defining an air passageway;
    a gasket having an aperture substantially aligned with said air passageway; and
    an air intake heater disposed in said air passageway and coupled to said gasket, wherein said gasket includes a first conductor plate having a portion thereof insulated from said intake manifold, said first conductor plate having an internal terminal coupled to said intake heater and an external terminal coupled to a power source, said gasket further including a second conductor plate having an internal terminal coupled to said air intake heater and an external terminal coupled to said power source.

17. The engine of claim 16 wherein said second conductor plate includes an integrally formed power cord support.

18. The engine of claim 17 wherein said power cord support includes an aperture for receipt of an electrical wire, said aperture selectively reducable in size to restrain said wire from moving relative to said external terminal of said second conductor.

19. The engine of claim 14 wherein said internal terminal of said first conductor plate includes a tab integrally formed with said first conductor plate.

20. The engine of claim 14 wherein said gasket forms an air tight seal between said intake manifold and said engine block.

* * * * *